| United States Patent [19] | [11] Patent Number: 4,778,858 |
| Ginnings | [45] Date of Patent: Oct. 18, 1988 |

[54] PREPARATION OF THERMOPLASTIC RESIN COMPOSITION BY SOLID STATE POLYMERIZATION

[75] Inventor: Paul R. Ginnings, Wadsworth, Ohio

[73] Assignee: The Goodyear Tire & Rubber Company, Akron, Ohio

[21] Appl. No.: 22,296

[22] Filed: Mar. 5, 1987

[51] Int. Cl.$^4$ .............................................. C08L 67/02
[52] U.S. Cl. .................................. 525/425; 525/437; 525/444; 525/446; 525/450; 525/474
[58] Field of Search ............... 525/425, 437, 444, 450, 525/446, 474

[56] References Cited

U.S. PATENT DOCUMENTS

| 4,408,022 | 10/1983 | Cincotta | 525/444 |
| 4,438,236 | 3/1984 | Cogswell | 525/165 |
| 4,572,852 | 2/1986 | Gartland | 428/35 |

*Primary Examiner*—Patricia Short
*Attorney, Agent, or Firm*—Alvin T. Rockhill

[57] ABSTRACT

This invention relates to a process for preparing a thermoplastic resin composition through a solid state polymerization process. The thermoplastic resin composition made in accordance with this invention is particularly suitable for use in thermoforming thin walled articles. The process of this invention specifically comprises (1) melt blending a polyethylene terephthalate prepolymer with at least one liquid crystalline polymer to produce a polyethylene terephthalate/liquid crystalline polymer blend; and (2) solid state polymerizing said polyethylene terephthalate/liquid crystalline polymer blend at a temperature within the range of about 195° C. to about 255° C. for a period of at least about 1 hour to produce a thermoplastic resin composition. The subject invention also deals with thermoforming such thermoplastic resin compositions into articles, such as food trays, having a crystallinity within the range of about 10% to about 40%.

8 Claims, No Drawings

PREPARATION OF THERMOPLASTIC RESIN COMPOSITION BY SOLID STATE POLYMERIZATION

BACKGROUND OF THE INVENTION

The wide spread popularity of microwave ovens for home use has initiated interest in food trays which can be used in either microwave ovens or convection ovens. Such food trays must be able to withstand oven temperatures which approach 200° C. Such trays are of particular value as containers for frozen prepared foods. It is accordingly necessary for such trays to have good impact strength and dimensional stability at both freezer and oven temperatures. It is, of course, also important for such trays to be capable of withstanding rapid heating from freezer temperatures of about −20° C. to oven temperatures of about 175° C. or even higher.

Containers which are capable of being heated in either convection ovens or microwave ovens are sometimes described as being dual-ovenable. Polyesters are highly suitable for use in making such dual-ovenable containers. However, it is important for the polyester to be in the crystalline state rather than the amorphous state in order to achieve satisfactory high temperature stability. Normally, polyesters will undergo crystallization by heat treatment at elevated temperatures and the crystallites formed will remain substantially stable up to near the melting point of the polyester. As a general rule, dual-ovenable containers which are comprised of polyester will be heat treated to attain a crystallinity of higher than about 25%.

Injection molding and thermoforming are widely known methods for forming thermoplastic polyester articles. In injection molding, the polyester is heated above its melting point and injected under sufficient pressure to force the molten polyester to fill the mold cavity. The molten polyester is cooled in the mold until it is rigid enough to be removed. The injection molding of a polyester composition containing 0.5% to 10% by weight isotactic polybutene-1 is described in U.S. Pat. No. 3,839,499. However, the injection molding method is generally not satisfactory for the production of thin walled articles, such as dual-ovenable trays, due to flow lines and layering which develop during the filling of the mold which lead to non-uniform properties, surface irregularities, and warping of the finished article.

Thermoforming is another process which is used commercially in the production of polyester articles. It is a particularly valuable technique for use in producing thin walled articles, such as dual-ovenable food trays, on a commercial basis. In thermoforming, a sheet of preformed polyester is preheated to a temperature sufficient to allow the deformation of the sheet. The sheet is then made to conform to the contours of a mold by such means as vacuum assist, air pressure assist, or matched mold assist. The thermoformed article produced is normally heat treated in the mold in order to attain a crystallinity of at least about 25%.

Crystallization rates can generally be improved by including a small amount of a nucleating agent in polyester compositions. For example, U.S. Pat. No. 3,960,807 discloses a process for thermoforming articles from a polyester composition which is comprised of (1) a crystallizable polyester, (2) a crack stopping agent, preferably a polyolefin, and (3) a nucleating agent. Polyester articles which are made utilizing such compositions generally have improved mold release characteristics and improved impact strength. Additionally, the utilization of such modified polyester compositions results in faster thermoforming cycle times due to the faster rate of crystallization which is attained.

U.S. Pat. No. 4,572,852 discloses a polyester molding composition which consists of (1) polyethylene terephthalate, (2) a polyolefin containing from 2 to 6 carbon atoms, and (3) an effective amount of a heat stabilizer. Thin walled thermoformed articles which are prepared utilizing such compositions exhibit improved impact strength and high temperature stability. For this reason dual-ovenable trays which are comprised of polyester/polyolefin blends are widely utilized commercially. Polyethylene terephthalate having an intrinsic viscosity of at least about 0.65 is widely utilized in such applications. It is necessary for the polyethylene terephthalate used in dual-ovenable trays to have an intrinsic viscosity of at least about 0.65 in order for the article to have sufficient impact strength at low temperatures, such as those experienced in a freezer.

High molecular weight polyesters (polyesters having high intrinsic viscosities) are commonly produced from low molecular weight polyesters of the same composition by solid state polymerization. The low molecular weight polyesters (prepolymers), which are used in such solid state polymerizations, are typically prepared by conventional melt polymerization techniques. Solid state polymerization is generally considered advantageous in that the handling of high molecular weight, high viscosity molten polymers during the melt phase is eliminated. Thermal degradation during the solid state portion of the polymerization is also essentially avoided.

Polyester/polyolefin blends which are utilized in thermoforming dual-ovenable containers are generally prepared by coextruding the polyester with the polyolefin at a temperature above their melting points. In other words, the polyester and the polyolefin are normally blended in a separate step after the polymers have been polymerized to the desired intrinsic viscosity. It would be highly desirable to eliminate this separate blending step. However, it is highly impractical to reactor blend polyethylene terephthalate with polyolefins, such as linear low density polyethylene. This is because agglomerates form and adhere to the reactor walls which presents very difficult cleaning problems. In other words, it is not practical to blend polyethylene into polyethylene terephthalate which is being melt polymerized. This limitation has precluded the possibility of reactor blending polyethylene into polyethylene terephthalate on a commercial basis.

SUMMARY OF THE INVENTION

It has been unexpectedly found that polyethylene terephthalate/liquid crystalline polymer blends offer an outstanding combination of properties for utilization as thermoplastic resin compositions which can be utilized in thermoforming heat set, thin walled articles such as dual-ovenable containers. In fact, dual-ovenable trays having outstanding creep resistance, excellent impact strength and excellent dimensional stability have been prepared utilizing such polyethylene terephthalate/liquid crystalline polymer blends. Additionally, it has been determined that liquid crystalline polymers having a melting point within the range of about 90° C. to about 300° C. can be reactor blended with polyethylene terephthalate. It has been further determined that such blends can be solid state polymerized for long time periods without significant polymer degradation. Thus, this invention makes reactor blending a commercially viable possibility without sacrificing the properties of articles made utilizing such blends. In fact, the properties of thin walled thermoformed articles made utilizing such compositions is improved in certain respects.

The subject invention discloses a process for the preparation of a thermoplastic resin composition which comprises: (1) melt blending a polyethylene terephthalate prepolymer with at least one liquid crystalline polymer to produce a polyethylene terephthalate/liquid crystalline polymer blend; and (2) solid state polymerizing said polyethylene terephthalate/liquid crystalline polymer blend at a temperature within the range of about 195° C. to about 255° C. for a period of at least about 1 hour to produce a thermoplastic resin composition. The presence of the liquid crystalline polymer does not appear to interfere with the solid state polymerization process or to slow the rate of solid state polymerization. The subject invention further discloses a technique which comprises thermoforming said thermoplastic resin composition into an article having a crystallinity within the range of about 10% to about 40%.

This invention also reveals a process for the preparation of a thermoplastic resin composition which comprises: (1) preparing polyethylene terephthalate in a conventional melt polymerization process in the presence of at least one liquid crystalline polymer to produce a polyethylene terephthalate/liquid crystalline polymer blend; and (2) solid state polymerizing said polyethylene terephthalate/liquid crystalline polymer blend at a temperature within the range of about 195° C. to about 255° C. for a period of at least about 1 hour.

The thermoplastic resin composition made utilizing the techniques of this invention are particularly valuable for use in thermoforming dual-ovenable containers. Such dual-ovenable containers and techniques for manufacturing them are disclosed by this invention. More specifically, this invention reveals a thermoformed, non-oriented, heat set, thin walled article which is comprised of: (1) from about 85 to about 99.5 weight percent polyethylene terephthalate having an intrinsic viscosity at 30° C. as measured in a 60/40 by volume mixed solvent of phenol/tetrachloroethane which is within the range of about 0.7 to about 2.0 dl/g; and (2) from about 0.5 to about 15 weight percent of a liquid crystalline polymer having a melting point within the range of about 90° C. to about 300° C. Such thermoformed articles will optimally also contain an effective amount of a heat stabilizer.

This invention specifically relates to a thermoplastic resin composition which is comprised of (1) from about 94 to about 99 weight percent polyethylene terephthalate having an intrinsic viscosity at 30° C. as measured in a 60/40 by volume mixed solvent of phenol/tetrachloroethane which is within the range of about 0.7 to about 2.0; and (2) from about 1 to about 6 weight percent of a liquid crystalline polymer having a melting point within the range of about 90° C. to about 300° C.

DETAILED DESCRIPTION OF THE INVENTION

The thermoplastic resin compositions of this invention are comprised of polyethylene terephthalate (PET) and at least about 0.5 weight percent of a liquid crystalline polymer (LCP). However, in most cases such compositions will contain no more than about 15 weight percent of the LCP. Such compositions will normally contain from 94 to 99 weight percent PET and from 1 to 6 weight percent LCP. It is generally preferred for the thermoplastic resin compositions of this invention to contain from 96 to 98 weight percent PET and from 2 to 4 weight percent LCP with the most preferred compositions containing from about 2.5 to about 3.5 weight percent LCP and from about 96.5 to about 97.5 weight percent PET. PET is comprised of repeat units which are derived from terephthalic acid or a diester thereof and ethylene glycol or a diester thereof. The PET utilized in the thermoplastic resin compositions of this invention can be a modified PET. Such modified PET can contain small amounts of repeat units which are derived from diacids other than terephthalic acid and/or glycols in addition to ethylene glycol. For instance, small amounts of isophthalic acid or a naphthalene dicarboxylic acid can be used in the diacid component utilized in preparing the PET. PET which has been modified with a small amount of a diol containing from 3 to 8 carbon atoms is also representative of a modified PET which can be used. For instance, a small amount of 1,4-butane diol can be utilized in the glycol component used in preparing the modified PET. Normally, no more than about 5 weight percent of the repeat units in such modified PET will be comprised of diacids or diols other than terephthalic acid and ethylene glycol. It is, of course, contemplated that diesters of such dicarboxylic acids and diols can also be used. In most cases, such modified PET will contain less than about 3% diacids other than terephthalic acid and less than 3% diols other than ethylene glycol. It will normally be preferred for such modified polyesters to contain only about 1% dicarboxylic acids other than terephthalic acid and/or less than 1% glycols other than ethylene glycol. In any case polyethylene terephthalate homopolymer is an excellent choice for utilization in the thermoplastic resin compositions of this invention.

Virtually any type of liquid crystalline polymer having a melting point within the range of about 90° C. to about 300° C. can be utilized in the thermoplastic resin compositions of this invention. Such liquid crystalline polymers are commercially available from a variety of sources. For instance, Celanese sells suitable liquid crystalline polymers under the trademark Vectra ®. Celanese Vectra ® A-900 LCP resin has been determined to be highly suitable for use in the thermoplastic resin compositions of this invention.

Liquid crystalline polymers having the general structural formula $\{A^1-R^1-A^2-R^2-R^3\}_n$ wherein $A^1$ and $A^2$ can be the same or different and represent aromatic groups, wherein $R^1$ represents a bridging group, wherein $R^2$ represents a functional unit, and wherein $R^3$ represents a spacer, are highly suitable for use in the resin compositions of this invention. The aromatic groups ($A^1$ and $A^2$) in such an LCP can, for instance, be a benzene ring or a naphthalene group. Some representative examples of suitable aromatic groups include 1,3-benzenylene groups, 1,4-benzenylene groups, 1,4-naphthalenylene groups, 1,5-naphthalenylene groups, and 2,6-naphthalenylene groups. 1,4-benzenylene groups have the structural formula:

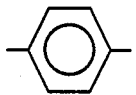

and 2,6-naphthalenylene groups have the structural formula:

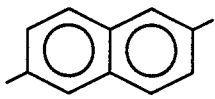

and both of these types of aromatic groups are highly preferred.

It is not necessary for there to be a bridging group, a functional unit, or a spacer in such a LCP. For instance, the aromatic groups in such a liquid crystalline polymer can be bonded directly together. Such a LCP can be represented by the simple structural formula $-\!\!\left[\text{A}^1-\text{A}^2\right]_n\!\!-$ wherein $A^1$ and $A^2$ represent aromatic groups which can be the same or different. Such a LCP which is derived from para-hydroxybenzoic acid and 6-hydroxy-2-napthoic acid can be represented by the structural formula:

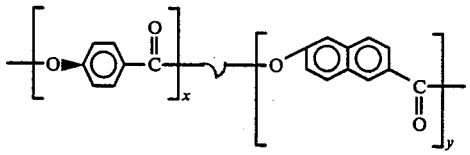

wherein x and y are integers and wherein $\sim$ indicates that the distribution of repeat can be random. Some representative examples of bridging groups ($R^1$) that can be present in such liquid crystalline polymers include: —CO—O— groups, —CR=CR— groups, —CR=NO— groups, —CO=NH— groups, —NO=N— groups, —C≡C— groups, and —CR=N—N=CR— groups wherein R represents an alkyl group containing from 1 to 4 carbon atoms or a hydrogen atom. Some representative examples of functional units ($R^2$) that can be present in such liquid crystalline polymers include —O— groups, —CO—O— groups, and —O—CO— groups. Some representative examples of spacers ($R^3$) that can be present in such liquid crystalline polymers include $-\!\!\left[\text{CH}_2\right]_n\!\!-$ groups, $-\!\!\left[\text{S}-\text{R}-\text{S}\right]\!\!-$ groups, —SiR$_2$—O— groups, and $-\!\!\left[\text{CH}_2-\text{CHR}\right]_n\!\!-$ groups, wherein R represents an alkyl group containing from 1 to 4 carbon atoms or a hydrogen atom. Spacer groups containing silicon, such as:

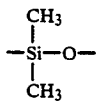

groups are believed to be particularly preferred spacers. Main-chain liquid crystalline polymers and side-chain liquid crystalline polymers which are suitable for use in the thermoplastic resin compositions of this invention are described in greater detail by Chung, "The Recent Developments of Thermotropic Liquid Crystalline Polymers", Polymer Engineering and Science, vol. 26, No. 13 (July, 1986) which is hereby incorporated herein by reference in its entirety.

The thermoplastic resin composition of this invention will preferably contain one or more heat stabilizers. The inclusion of one or more heat stabilizers has particular utility when the finished article being made from the resin will be subjected to high service temperature conditions for long periods of time. The retention of adequate physical properties, especially impact strength, is very important in applications such as food trays for use in dual-ovenable applications. Heat stabilizers as used herein are compounds which demonstrate antioxidant properties, the most important of which is the capacity of inhibiting oxidation. An effective heat stabilizer in the practice of this invention must be capable of protecting the thermoformed article during exposure to elevated temperatures. The following compounds are represented examples of useful heat stabilizers which can be incorporated into the thermoplastic resin compositions of this invention: alkylated substituted phenols, bisphenols, thiobisacrylates, aromatic amines, organic phosphites, and polyphosphites. The particular aromatic amines which demonstrate specific heat stabilizing capabilities include: primary polyamines, diarylamines, bisdiarylamines, alkylated diarylamines, ketone-diarylamine condensation products, aldehyde-amine condensation products, and aldehyde imines. Conditions which would be considered severe would be those in which the thermoformed article would be exposed to temperatures near 200° C. for periods exceeding about 30 minutes. Preferred heat stabilizers for such severe high temperature applications, particularly where any staining or discoloration from the heat stabilizer is undesirable, are the polyphenols which contain more than two phenol ring structures. Some representative examples of suitable polyphenols include tetrakis(methylene-3(3,5-di-t-butyl-4-hydroxy phenyl)proprionate)methane and 1,3,5-trimethyl-2,4,6-tris(3,5-di-t-butyl-4-hydroxybenzyl)benzene.

Persons skilled in the art will be able to easily ascertain the effective amount of heat stabilizer needed, with this amount generally being within the range of about 0.005 to about 2% by weight based upon the total weight of the thermoplastic resin composition. It will normally be preferred for the amount of heat stabilizer utilized to be within the range of 0.01 to 0.5% by weight, based upon the total weight of the thermoplastic resin composition. The amount of heat stabilizer used will vary with such factors as the degree of protection required, the severity of heat exposure, solubility limitations of the heat stabilizer chosen in the thermoplastic resin composition, and the overall effectiveness of the heat stabilizer.

One or more pigments or colorants can also be added to the thermoplastic resin composition in order to provide it with a desired color. For instance, titanium dioxide can be included in the thermoplastic resin composition in order to provide it with a brilliant white color. One or more colorants can also be added to the thermoplastic resin composition in order to provide it with any of a multitude of colors. Such colorants will normally not act as nucleating agents. Some representative examples of non-nucleating organic colorants include: phthalocyanine blue, solvent red 135, and disperse yellow 64 (CAS No. 10319-14-9). Many other dyes of the solvent and disperse groups are also useful for coloring the thermoplastic resin compositions of this invention. The amount of colorant or combination of colorants needed to obtain a specific desired color can be easily ascertained by persons skilled in the art.

The thermoplastic resin compositions of this invention can be prepared by simply melt blending the PET with the liquid crystalline polymer and optionally a heat stabilizer and/or a colorant. Such melt blending is done at a temperature at which the PET is in the liquid state. PET has a melting point within the range of 256° C. to 271° C., depending upon its degree of crystallinity. Since such a melt blending procedure must be carried out above the melting point of the PET, it will normally be done at a temperature of at least about 270° C. In such a melt blending procedure, the liquid crystalline polymer is simply dispersed throughout the molten PET. Sufficient mixing action will be applied so as to result in the formation of a homogeneous system. In other words, the liquid crystalline polymer and any heat stabilizers or colorants added should be uniformly dispersed throughout the PET in order to produce optimal thermoplastic resin compositions. Such a melt blending procedure can commercially be carried out in extruders which provide sufficient shearing forces so as to result in adequate mixing.

It will normally be preferred for the thermoplastic resin compositions of this invention to be prepared by utilizing a reactor blending process. Such a reactor blending procedure eliminates a subsequent melt blending step. Reactor blending can be carried out by simply adding the liquid crystalline polymer to the reaction zone in which the PET is being prepared through conventional melt polymerization. The presence of the liquid crystalline polymer during the preparation of PET through melt polymerization does not interfere with the polymerization and no special precautions or modifications of the melt polymerization are required. For this reason conventional melt polymerization techniques can be used with the only modification required being the addition of the liquid crystalline polymer to the reaction zone or polymerization reactor. The liquid crystalline polymer can be added during any stage of the melt polymerization. However, filtration steps are normally included in commercial melt polymerizations used in preparing PET and the liquid crystalline polymers will have a tendency to clog filters of the size range normally used. For this reason it will be preferable to add the liquid crystalline polymer to the melt polymerization reaction system after impurities therein have been filtered out. If an additional filtration step is desired after the liquid crystalline polymer has been added, a filter having a size at least as large as the LCP particles should be utilized. Such a filter will be capable of removing large impurities from the polymerization system and will not be as susceptible to clogging as filters of more conventional sizes.

Melt polymerization techniques can be used to produce PET having high intrinsic viscosities (molecular weights). However, in most cases it will be highly desirable to utilize a solid state polymerization technique in order to increase the intrinsic viscosity of the PET to levels over about 0.6. The PET prepolymers utilized in such solid state polymerizations are prepared by conventional melt polymerization techniques and contain a liquid crystalline polymer in addition to the PET prepolymer. Thus, the intrinsic viscosity of thermoplastic resin compositions prepared by reactor blending can be further increased by utilizing solid state polymerization techniques. The PET prepolymers used in such solid state polymerizations will typically have intrinsic viscosities within the range of about 0.3 to about 0.7 dl/g in a 60/40 phenol/tetrachloroethane solvent system at a temperature of 30° C. and at a concentration of 0.4 g/dl. In many commercial processes the PET prepolymer will have an intrinsic viscosity within the range of about 0.5 to about 0.65 dl/g. After the desired intrinsic viscosity has been reached through melt polymerization, the prepolymer is typically formed into pellets or chips for solid state polymerization. The pellets or chips are, of course, comprised of the PET prepolymer, the liquid crystalline polymer, and optionally, heat stabilizers and colorants. Such chips or pellets of the prepolymer can be of virtually any shape and can vary greatly in size. However, as a general rule, the smaller the size of the pellets or chips of prepolymer, the faster the solid state polymerization will proceed.

The prepolymer which is comprised of low molecular weight PET and the liquid crystalline polymer is generally converted from the amorphous to the crystalline state prior to solid state polymerization in order to raise its sticking temperature. This is done in order to keep pellets or chips of the prepolymer from sticking together as a solid mass in the solid state polymerization reactor. Preferably the prepolymer being solid state polymerized will have a crystallinity of at least about 20%. This crystallinity can be attained utilizing any suitable means such as by controlled heating of the polyester prepolymer or by treating the prepolymer with the vapor of a suitable organic solvent.

The sticking temperature of crystalline or partially crystalline polyethylene terephthalate prepolymers is about 230° C. which is much higher than their sticking temperature in the amorphous state which is about 100° C. to 150° C. Polyester prepolymers are commonly crystallized to a crystallinity of at least about 20% prior to solid state polymerization. Typically, a PET prepolymer can be converted to about 20% to 40% crystallinity by heating at 150° C. for 5 minutes to 300 minutes. At lower crystallization temperatures, longer heating times are normally required. Suitable time-temperature relationships can be easily determined by persons having skill in the art.

The amount of time required to crystallize the surfaces of pellets or chips comprised of the prepolymer composition by vapor treatment will vary with the concentration of the vapor, with the type of volatile organic compound being utilized, with the initial intrinsic viscosity of the prepolymer being utilized and with the crystallinity desired. Since vapor treatment crystallizes the prepolymers from their surface inward, generally a lower degree of crystallinity is required to prevent chips or pellets made out of the prepolymer from sticking than is required when the prepolymers are crystallized utilizing a thermal treatment. This increased degree of crystallization in the prepolymer is attained by simply exposing it to the vapors of a suitable organic compound, such as a volatile chlorinated hydrocarbon, a volatile ketone, tetrahydrofuran, ethylene oxide, or propylene oxide. Methylene chloride and acetone are particularly preferred volatile organic compounds for utilization in such vapor crystallizations.

PET prepolymers can be solid state polymerized in accordance with the process of this invention in a batch or continuous process. Suitable solid state polymerization temperatures can range from a temperature just above the threshold temperature of the polymerization reaction up to a temperature within a few degrees of the sticking temperature of the PET which can be well below its melting point. For instance, the sticking temperature of crystalline or partially crystalline PET prepolymers is about 240° C. which is much higher than their sticking temperature in the amorphous state which is typically about 100° C. to 150° C.

The solid state polymerization temperature utilized will typically be from about 1° C. to about 50° C. below the sticking temperature of the PET prepolymer. As a general rule, the optimum solid state polymerization temperature for a PET prepolymer will be from about 5° C. to about 20° C. below its sticking temperature. For example, in the solid state polymerization of pellets or chips comprised of PET, the highest temperatures which can normally be employed range from 240° C. to about 255° C. which is just below its sticking temperature and melting point. Generally, the PET prepolymer/LCP composition will be solid state polymerized at a temperature of from about 195° C. to about 255° C. In most cases, PET prepolymer/LCP compositions will be solid state polymerized at a temperature of from 210° C. to 250° C., with temperatures within the range of 220° C. to 245° C. being preferred.

As the solid state polymerization of a polyester prepolymer proceeds, its sticking temperature can increase. Thus, the solid state polymerization temperature can be incrementally increased during the course of the polymerization. For example, in the case of polyethylene terephthalate the process described in U.S. Pat. No. 3,718,621, which is incorporated herein by reference in its entirety, can be utilized.

The solid state polymerization is conducted under a vacuum or in the presence of a stream of an inert gas. Normally such solid state polymerizations are conducted in the presence of an inert gas stream. It is highly desirable for the inert gas to flow uniformly throughout the solid state polymerization zone which is filled with pellets which are comprised of the PET prepolymer/LCP composition which is being polymerized. In order to help insure that the inert gas flows homogeneously or uniformly through the solid state polymerization zone without bypassing certain areas in it, a device for dispersing the inert gas is generally used. Thus, a good polymerization reactor will be designed in such a way that the inert gas will flow homogeneously through the prepolymer in it. It should be noted that most of the inert gas flows around the pellets or chips of polyester prepolymer as it streams through the solid state polymerization zone.

Some suitable inert gases for use in the solid state polymerization process of this invention include nitrogen, carbon dioxide, helium, argon, neon, krypton, xenon, and certain industrial waste gases. Various combinations or mixtures of different inert gases can also be used. In most cases nitrogen will be used as the inert gas.

The total amount of inert gas needed to solid state polymerize a polyester prepolymer into a high molecular weight polyester resin in a given solid state polymerization reactor at a given temperature can be greatly reduced by pulsing the inert gas through the polyester prepolymer. The minimum amount of inert gas that needs to be pulsed through the PET prepolymer/LCP composition per unit time per unit weight will vary with the solid state polymerization temperature used and the design of the polymerization reactor. The optimum manner of pulsing the inert gas through the reactor will also vary with the polymerization temperature used and the design and size of the polymerization reactor. Usually, between about 0.05 and about 2 liters of inert gas per hour will be pulsed through the polyester prepolymer per kilogram of the polyester prepolymer. Generally the best way to pulse the inert gas through the polyester prepolymer being solid state polymerized is to repeatedly turn the flow of inert gas on and off. U.S. Pat. No. 4,532,319, which is incorporated herein by reference in its entirety describes this technique for reducing the consumption of inert gas in greater detail.

The solid state polymerization zone can be of virtually any design that will allow the PET prepolymer/LCP composition to be maintained at the desired solid state polymerization temperature for the desired residence time and which allows for removal of reaction by-products, such as acetaldehyde. Such solid state polymerization zones can be reactors which have a fixed bed, a static bed, a fluidized bed, or a moving bed. In most cases, it is preferred to utilize a tubular polymerization reactor wherein the pellets or chips of prepolymer flow through the reactor for the desired residence time. Such tubular reactors have a substantially uniform cross-section and a sufficient height to allow the PET prepolymer/LCP composition to flow by reason of the force of gravity from the top to the bottom of the reactor in the desired residence time. In other words, the prepolymer moves from the top to the bottom of such a tubular polymerization reactor in a partially dammed state. The rate of flow through such a reactor can be controlled by regulating discharge at the bottom of the reactor. It is generally preferred to allow an inert gas to flow countercurrently (upwardly) through the reactor at a gas velocity well below the turbulence point so that the prepolymer is not fluidized (the pellets or chips always remain in contact with each other).

The polyester prepolymer will be solid state polymerized for a time sufficient to increase its molecular weight or IV to that of the thermoplastic resin composition desired. It will be desirable for the high molecular weight polyester resin being prepared to have an IV of at least 0.7 dl/g. In most cases the high molecular weight resin will have an IV of at least 0.85 dl/g and for many applications will preferably have an IV of at least about 1.0 dl/g (within the range of 1.0 to 2.0 dl/g).

The polymerization time required to increase the molecular weight of the polyester prepolymer to a given desired molecular weight will, of course, vary with the polymerization temperature used, the IV of the PET prepolymer utilized, and with the final IV desired. Very long polymerization times can be utilized if ultra-high molecular weight resins are desired. Generally, the solid state polymerizations of this invention will be conducted for a period of at least about one hour. In most cases the polymerization times utilized in carrying out the process of this invention will range from about 2 hours to about 12 hours. In most cases it will be preferred to utilize a polymerization time ranging between about 3 hours and about 6 hours. Such solid state polymerizations can, of course, be carried out utilizing batch, semi-continuous, or continuous techniques. In the case of continuous solid state polymerizations, the polymerization times referred to are residence times in the solid state polymerization reaction zone.

After the thermoplastic resin compositions of this invention have been prepared, they can be utilized in making a wide variety of useful articles of manufacture. The thermoplastic resin compositions of this invention have particular value for use as thermoforming compositions from which thin walled articles such as dual-ovenable trays can be made. The articles of manufacture to which this invention relates are thin walled thermoformed articles. Thin walled as used herein means articles having wall thicknesses of less than about 1 mm. An article having a wall thickness of greater than 1 mm (40 mils) could be made using this invention with its thermoforming techniques only if the preformed sheet could be preheated to a suitable thermoforming temperature while maintaining the substantial amorphous state of the sheet. However, currently available methods of preheating the sheet do not uniformly distribute heat quickly enough to minimize crystallinity increase prior to forming when the parts have a wall thickness of greater than 1 mm.

Since a partially crystalline finished article is necessary for good dimensional stability at high temperatures, knowledge of the degree of crystallinity or percent of crystallinity is of considerable importance. Density is a convenient method of determining the percent of crystallinity since there is a direct relationship between the two for a given polyester composition. A calibrated gradient column can be used for determining density at a particular temperature. The density value can then be converted into a percent of crystallinity.

The terms crystallization temperature and crystallization onset are used interchangeably to mean the temperature or temperature range in which a regularly repeating morphology, brought about by a combination of molecular mobility and secondary bonding forces, is induced in a polymer over a molecular distance of at least several hundred angstroms. The crystallization temperature or crystallization onset can be visually observed as the point at which a substantially amorphous, unoriented sheet of PET/LCP changes from a translucent, hazy appearance to a white appearance.

As used throughout this specification and the appended claims, the term glass transition temperature means that temperature or temperature range at which a change in slope appears in the volume versus temperature curve for said polymer and defining a temperature region below which the polymer exhibits a glassy characteristic and above which the polymer exhibits a rubbery characteristic. The glass transition temperature (Tg) of polyethylene terephthalate has been reported to be at 67° C. in the amorphous state, at 81° C. in the crystalline state, and at 125° C. in the oriented crystalline state.

Another aspect of this invention relates to a process for producing heat set, thin-walled articles from the thermoplastic resin compositions of this invention using conventional thermoforming equipment. The complete technique consists of the following steps:

1. Forming a substantially amorphous sheet from the homogeneously blended PET/LCP composition.
2. Preheating the sheet until it softens and positioning it over the mold.
3. Drawing the preheated sheet onto the heated mold surface.
4. Heatsetting the formed sheet by maintaining sheet contact against the heated mold for a sufficient time period to partially crystallize the sheet.
5. Stripping the part out of the mold cavity.

The sheeting and film for use in the thermoforming process can be made by any conventional method. The most common method being by extrusion through a flat die. It is important that the sheet or film be quenched immediately after extrusion in order to minimize the extent of crystallization developed after forming.

The term substantially amorphous as used herein shall mean a sheet having a level of crystallinity low enough to enable thermoforming of the sheet to be accomplished with satisfactory mold definition and part formation. In currently available thermoforming processes, the level of crystallinity of the preformed sheet should not exceed 10 percent.

The preheating of the substantially amorphous sheet prior to positioning over the thermoforming mold is necessary in order to achieve the very short molding times required for a viable commercial process. The sheet must be heated above its Tg and below the point at which it sags excessively during positioning over the mold cavity. The preferred range is 120°-160° C., most preferably 135°-150° C.

This invention can be practiced by using any of the known thermoforming methods include vacuum assist, air assist, mechanical plug assist or matched mold. The mold should be preheated to a temperature sufficient to achieve the degree of crystallinity desired. Selection of optimum mold temperature is dependent upon type of thermoforming equipment, configuration and wall thickness of article being molded and other factors. The operable range of mold temperatures is 150°-215° C. The preferred range is 170°-190° C.

Heatsetting is a term describing the process of thermally inducing partial crystallization of a polyester article without appreciable orientation being present. In the practice of this invention, heatsetting is achieved by maintaining intimate contact of the film or sheet with the heated mold surface for a sufficient time to achieve a level of crystallinity which gives adequate physical properties to the finished part. It has been found that desirable levels of crystallinity should be about 10 to about 40 percent. For containers to be used in high temperature food application, it was found that levels of crystallinity above 15 percent were necessary for adequate dimensional stability during demolding operations. A preferred range of crystallinity is from 20 to 35 percent, this range yields parts with excellent dimensional stability and impact resistance.

The heat set part can be stripped out of the mold cavity by known means for removal. One method, blow back, involves breaking the vacuum established between the mold and the formed sheet by the introduction of compressed air. In commercial thermoforming operation, the part is subsequently trimmed and the scrap ground and recycled.

In the preparation of films or sheeting for subsequent use in thermoforming processes, it is extremely important that the LCP be homogeneously dispersed throughout the PET to form a homogeneous blend in order to achieve optimum results. The film can be produced by conventional extrusion or casting methods. Depending upon the method employed in making the film or sheeting, the intrinsic viscosity of the film or sheeting produced may be nearly the same or slightly lower than the intrinsic viscosity of the starting thermoplastic resin composition. In other words, the intrinsic viscosity of the thermoplastic resin composition may be reduced slightly by the casting or extrusion process. The thermoformed articles made should have intrinsic viscosities which are similar to the intrinsic viscosities of the film or sheeting from which they are made.

Throughout the specification and appended claims, all percent expressions are weight percent based on the total weight of the composition polymer, sheet or article. The following examples are intended to be illustrative of the invention rather than limiting its scope.

EXAMPLE 1

PET was prepared by reacting terephthalic acid with ethylene glycol utilizing a conventional melt polymerization technique. At an intrinsic viscosity of 0.6 dl/g, 3 weight percent of a liquid crystalline polymer was added yielding a PET/LCP melt blend which was comprised of 97 weight percent PET and 3 weight percent LCP. The LCP added was Celanese Vectra ® A-900. NMR (nuclear magnetic resonance) analysis indicates that Vectra ® A-900 shows bands associated with para-hydroxybenzoic acid and 6-hydroxy-2-naphthoic acid. It is believed that Vectra ® A-900 is comprised of repeat units which are derived from the following monomers:

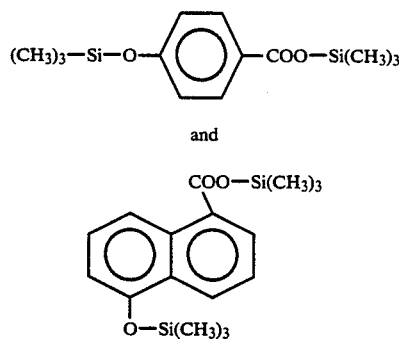

and

The resulting reactor blend was mixed for about 10 to 15 minutes and then discharged from the reactor and diced. Because of insufficient shear in the reactor, the individual particles of the LCP did not melt, but were dispersed throughout the PET. The resulting diced mixture, which essentially contained the LCP which was encapsulated in a PET matrix was then solid state polymerized to an intrinsic viscosity of 0.923 dl/g.

Sheeting was then prepared by extruding the diced material which had been solid stated in a 1.75 inch (4.45 cm) HPM extruder. The Maddox mixing head on the extruder screw produced sufficient shearing force to homogeneously blend the LCP into the PET and a homogeneous, high quality, glossy sheet resulted. The sheeting prepared was then thermoformed into trays utilizing a Comet thermoformer. The trays which were made in the thermoforming process had a thickness of 30 mils. The thermoforming process was carried out utilizing a film temperature of 290°–300° F. (143°–149° C.), a mold temperature of 315° F. (157° C.), a cycle time in the oven of 11.5 seconds, and a mold retention time of 6 seconds.

The trays prepared in this experiment were very satisfactory. In fact, the trays made were determined to have excellent low temperature impact strength at −20° F. (−29° C.).

EXAMPLE 2 (COMPARATIVE)

In this experiment an attempt was made to reactor blend linear low density polyethylene with PET. PET was prepared through a conventional melt polymerization as described in Example 1. Linear low density polyethylene was then added to the reactor in which the PET was being prepared through melt polymerization (as in Example 1). However, in this experiment reactor blending was highly impractical because the linear low density polyethylene agglomerated and stuck to the walls of the reactor which resulted in a very unacceptable situation.

EXAMPLE 3 (COMPARATIVE)

In this experiment an ionomer modified polyethylene (DuPont's Surlyn TM 9721) was reactor blended with PET using the procedure described in Example 1. However, experimentation showed that the ionomer modified polyethylene did not improve the crystallization rate of the PET. Accordingly, it is clear that ionomer modified polyethylene cannot be incorporated into the type of molding composition required for making dual-ovenable trays through a reactor blending procedure.

EXAMPLE 4 (COMPARATIVE)

In this experiment, a thermoplastic polyester elastomer (Hytrel ® 4074) was reactor blended with PET using the procedure described in Example 1. However, experimentation showed that the thermoplastic polyester elastomer did not improve the crystallization rate of the PET.

This experiment shows that it is not possible to reactor blend thermoplastic polyester elastomers into PET. In fact, experimentation has shown that Hytrel ® 4074 cannot withstand a melt temperature of 270° C. for even a period of only 5 minutes without decomposing. It is, therefore, very clear that Hytrel ® 4074 cannot be reactor blended into PET since a minimum reactor blending period of at least about 15 minutes would be required. A period of 15 minutes is far longer than the thermoplastic polyester elastomer could withstand the temperatures required for reactor blending.

While certain representative embodiments and details have been shown for the purpose of illustrating this invention, it will be apparent to those persons skilled in this art that various changes and modifications can be made therein without departing from the scope of this invention.

What is claimed is:

1. A process for the preparation of a thermoplastic resin composition which comprises: (1) preparing polyethylene terephthalate in a conventional melt polymerization process in the presence of at least one liquid crystalline polymer to produce a polyethylene terephthalate/liquid crystalline polymer blend; wherein said blend is comprised of from about 94 to about 99 weight percent polyethylene terephthalate and from about 1 to about 6 weight percent liquid crystalline polymer and wherein said liquid crystalline polymer has a melting point within the range of about 90° C. to about 300° C. and (2) solid state polymerizing said polyethylene terephthalate prepolymer/liquid crystalline polymer blend at a temperature within the range of about 195° C. to about 255° C. for a period of at least about 1 hour.

2. A process as specified in claim 1 wherein said polyethylene terephthalate prepolymer has an intrinsic viscosity which is within the range of about 0.3 dl/g to about 0.7 dl/g.

3. A process as specified in claim 1 wherein said liquid crystalline polymer is selected from the group consisting of main-chain liquid crystalline polymers and side-chain liquid crystalline polymers.

4. A process as specified in claim 3 wherein said polymerization is conducted at a temperature within the range of 210° C. to 250° C.

5. A process as specified in claim 4 wherein said polymerization is carried out for a period of from about 2 hours to about 12 hours.

6. A process as specified in claim 5 wherein the thermoplastic resin composition produced has an intrinsic viscosity of at least 0.85 dl/g.

7. A process as specified in claim 6 wherein said blend is comprised of from about 96 to about 98 weight percent polyethylene terephthalate and from about 2 to 4 weight percent liquid crystalline polymer.

8. A process as specified in claim 7 wherein said blend further comprises an effective amount of a heat stabilizer.

* * * * *